United States Patent [19]

Bekheet

[11] Patent Number: 4,913,688
[45] Date of Patent: Apr. 3, 1990

[54] PULLEY ASSEMBLY FOR ACCESSORY CLUTCH HAVING NONMETALLIC SHEAVE

[75] Inventor: Zaki C. Bekheet, Canton, Mich.
[73] Assignee: Ford Motor Company, Dearborn, Mich.
[21] Appl. No.: 364,386
[22] Filed: Jun. 12, 1989
[51] Int. Cl.⁴ .............................................. F16H 55/36
[52] U.S. Cl. .................... 474/170; 474/177
[58] Field of Search ................. 474/166–171, 474/174, 177, 190, 191; 29/159 R

[56] References Cited

U.S. PATENT DOCUMENTS

| | | | |
|---|---|---|---|
| 2,341,272 | 2/1944 | Firth et al. | 474/170 |
| 4,468,210 | 8/1984 | McCutchan, Jr. | 474/170 |
| 4,473,363 | 9/1984 | McCutchan, Jr. | 474/170 X |
| 4,571,225 | 2/1986 | Lengenfelder, Jr. et al. | 474/177 X |

Primary Examiner—Thuy M. Bui
Attorney, Agent, or Firm—Frank G. McKenzie; Donald J. Harrington

[57] ABSTRACT

A belt-driven pulley assembly for an accessory drive includes a steel pulley and a drivebelt sheave made of fiber reinforced phenolic material. The inner surface of the sheave is bonded to the outer surface of the pulley after applying plastic adhesive in a precured condition and inserting the pulley within the sheave. The position of the components are maintained during an elevated temperature polymerization cycle. The thickness of the adhesive is defined by the radial depth of rails extending inward toward the mounting surface of the pulley and by the depth of a stop bead formed on an inclined surface of the sheave that faces the inclined surface of the pulley.

6 Claims, 2 Drawing Sheets

PULLEY ASSEMBLY FOR ACCESSORY CLUTCH HAVING NONMETALLIC SHEAVE

BACKGROUND OF THE INVENTION

1. Field of the Invention

This invention relates to the field of belt-driven pulleys, especially to the pulleys for electromagnetically actuated automotive accessory drive clutches.

2. Description of the Prior Art

An endless rubber reinforced drivebelt is supported and guided rotatably on at least two sheaves, one of which is driven by the engine of an automotive vehicle. Power is transmitted in tension along the belt, which rotatably drives the sheave of an accessory drive clutch. The sheaves operate in a hot environment under the hood near the engine. Conventionally, the magnitude of the forces developed in the belt and the required reaction force on the sheave require the sheaves to be made from low carbon steel. In order to improve fuel efficiency, electromagnetic clutches that complete a driving connection between a belt-driven sheave and an accessory drive shaft are cycled on and off repeatedly at eight to ten second intervals. This cycling increases the level of noise under the hood and generates additional heat conducted through the pulley assembly and sheave to the drivebelt. The elevated operating temperature in the engine compartment reduces the service life of the drivebelt.

SUMMARY OF THE INVENTION

To avoid these disadvantages, a sheave, formed of fiber reinforced phenolic material having V-shaped grooves on its outer surface for engagement by a drivebelt, is bonded with epoxy adhesive to a mounting surface on a steel pulley. The pulley is joined by welding to a pulley disc, which faces the corresponding clutch disc, mechanically joined in a fixed position to a driveshaft of accessory equipment, e.g., the driveshaft of an air conditioning compressor. The clutch disc and pulley disc become drivably engaged magnetically when a coil of copper wire is energized with DC current through a clutch controller.

The sheave includes a first surface adjacent the mounting surface of the pulley and an inclined surface substantially parallel to an inclined surface on the pulley. The first surface is formed with rails angularly spaced about the axis of the pulley and extending from a cylindrical portion of the first surface radially inward toward the mounting surface. These rails are tapered axially from a maximum depth at a free end of the sheave to a minimum depth adjacent its inclined surface. During assembly when the sheave is moved over the mounting surface of the pulley, the minimum depth of the rails Provide a relatively large clearance between the mounting surface and the rail, but as the sheave moves further axially on the mounting surface the depth of the rail takes up this clearance and the sheave seats on the mounting surface. The annular spaces between the rails contain epoxy adhesive and the depth of the rails define the thickness of the adhesive.

The inclined surface of the sheave is formed with an annular stop bead which contacts the inclined surface of the pulley to establish the location of the transverse center line of the sheave with respect to the pulley. The stop beads are discontinuous axially and define between them passages through which air and excessive epoxy adhesive is extruded during the assembly process from the spaces between the sheave and pulley intended to contain the adhesive. By means of these features and the ability they afford an operator to see and monitor the volume of adhesive flowing from the vent passages, an appropriate volume of adhesive to be applied to the parts before assembly can be established to determine whether the applied volume is sufficient to adequately wet the mating surface or is insufficient to adequately fill the spaces between the rails.

After the stop surfaces on the sheave contact the inclined surface of the pulley during assembly, the adhesive polymerizes or cures while relative positions of the pulley and sheave are maintained. The cure process can be conducted at temperatures of approximately 200° F. for a period of approximately twenty minutes, or polymerization can occur at room temperature over a longer period.

DESCRIPTION OF THE PREFERRED EMBODIMENT

Figure 1:
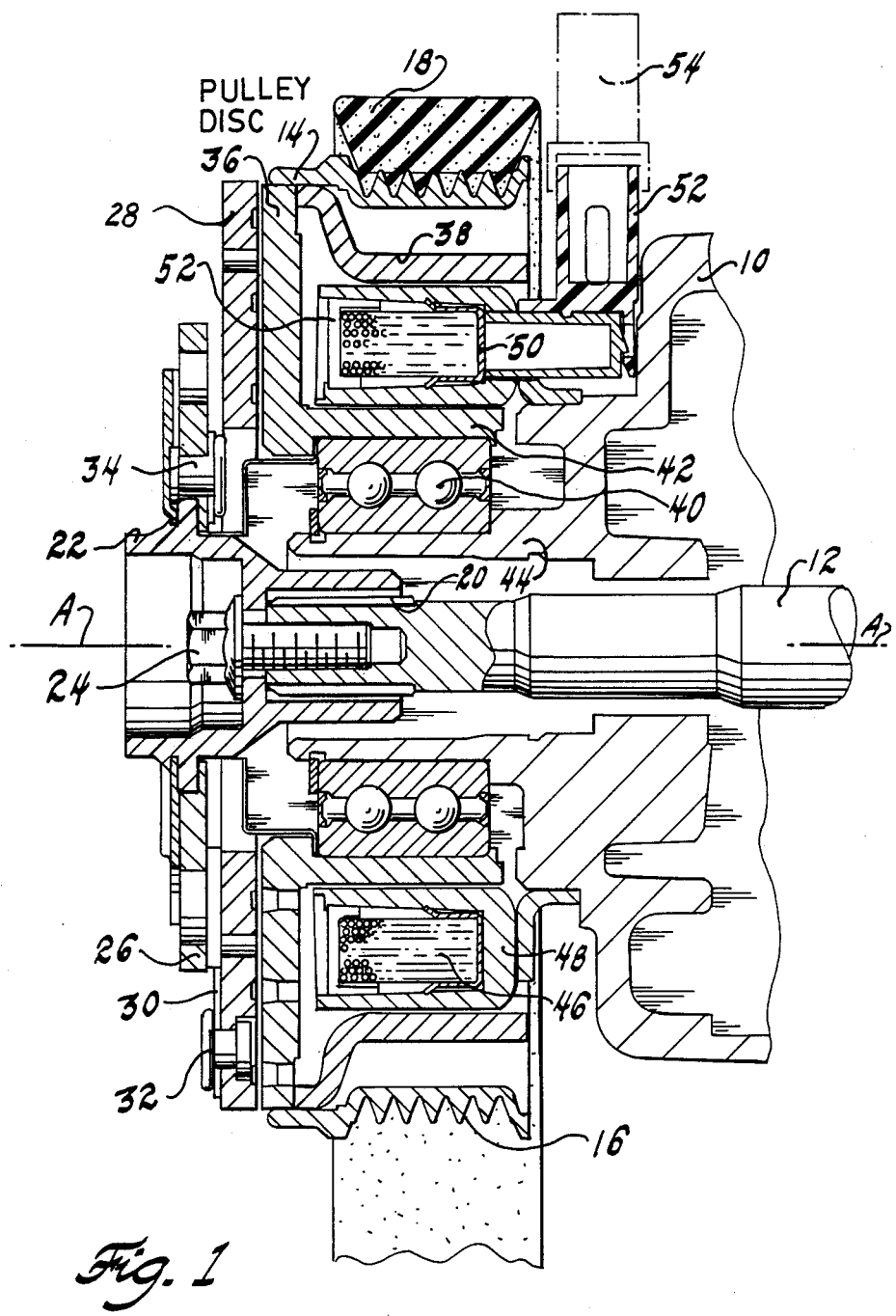
FIG. 1 is a cross section through a belt-driven pulley assembly for an electromagnetic automotive accessory clutch.

Referring first to FIG. 1, an accessory, such as an air conditioning system compressor, is shown in position adjacent an accessory clutch assembly for drivably connecting and disconnecting the driveshaft 12 of the compressor and sheave 14. The outer surface 16 of the sheave is drivably engaged by an endless rubber drive belt 18 whose inner surface is formed with V-shaped notches corresponding to those on the inner surface of the sheave to improve driving engagement. The belt engages another pulley (not shown), which is drivably connected to the crankshaft of an internal combustion engine.

Torque is transferred to the driveshaft from clutch hub 22 through a spline connection 20. Tension continuity between shaft and hub is provided by bolts 24 seated on a web of the hub and having screw threads engaging internal threads formed on the end of the driveshaft. Plate 26 is permanently fixed to the outer surface of the hub by swaging hub material into recesses formed in the plate to receive the swaged material, thereby producing a torsional connection between these components. A resilient drivable connection between the hub plate and a clutch disc 28 is made through tension straps 30 located at approximately 120° intervals about axis A—A and joined at each of their ends by rivet 32, fixed to the disc, and rivet 34, fixed to the plate.

A pulley assembly includes the pulley and disc 36, located adjacent the face of clutch disc 28 and joined permanently to sheave 14; axial extending flange 38; bearing 40, located within a pocket between axial flange 42 extending from the pulley disc and parallel flange 44 integral with the compressor housing 10. The bearing supports disc 36 and sheave 14 in rotation on the compressor housing as the belt drives the sheave in rotation from the engine. A coil of copper wire wound about axis A—A is located within a coil retainer 48, located in a pocket between flanges 38 and 42. One axial end of the coil is fitted within a bobbin 50. The opposite axial end of the coil is potted within retainer 48 by flowing uncured plastic resin sealant 52 over the annular end of the wire coil and containing the epoxy within the retainer.

The ends of the wire forming the coil are lead from the retainer to an electrical connection on the blades of a plug 52 and mating receptacle 54 carrying DC current from a clutch control to the coil. When energized, the coil induces an electromagnetic field that causes clutch disc 28 to move axially into engagement with the adjacent surface of the pulley disc 36. When this occurs, tension is developed in the straps and the hub plate is rotatably driven by the straps due to the riveted connection at each of their ends. Hub 22 is driven rotatably by the swaged connection at the inner surface of the hub plate, and driveshaft 12 is driven from the hub through spline 20. The clutch controller is adapted to frequently cycle the electrical current supplied to the coil 46 for periods normally lasting seven or eight seconds, i.e., about four cycles per minute, in order to minimize the accessory load placed on the engine for purposes of fuel consumption.

Figure 2:
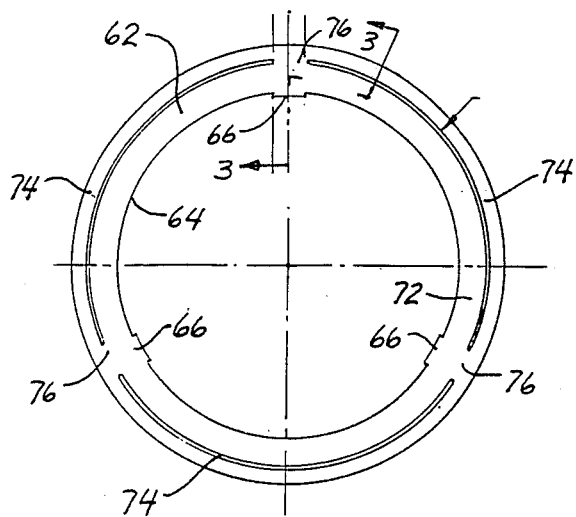
FIG. 2 is an end view taken in direction 2 of FIG. 3 of a sheave according to this invention.
Figure 3:
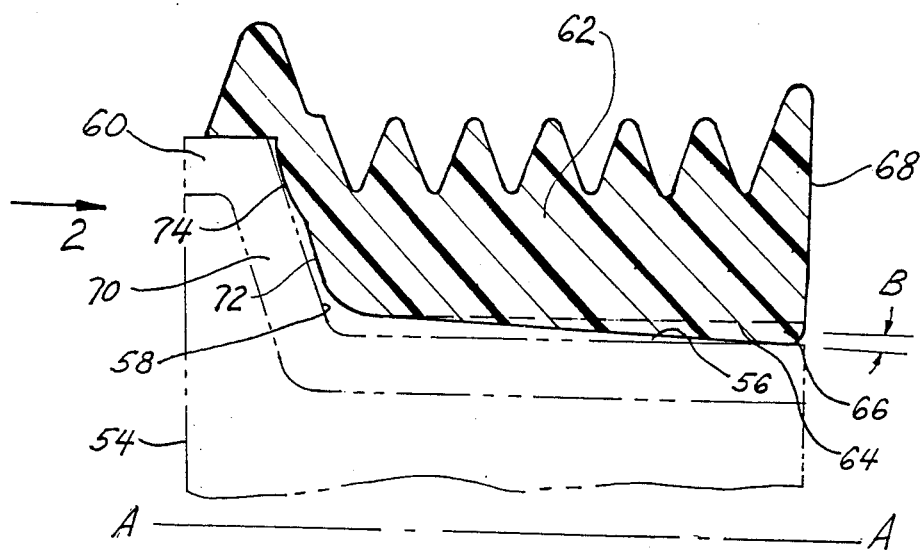
FIG. 3 is a cross section taken at plane 3—3 of FIG. 2.

FIGS. 2 and 3 show a second form of the sheave and pulley. Here pulley 54, formed of low carbon steel, has a cylindrical mounting surface 56 coaxial with A—A and a conical inclined surface 58 intersecting the mounting surface and inclined radially outward therefrom to a short cylindrical flange 60. The sheave 62 is molded of a thermosetting plastic compound, such as DUREZ Thermosets 31735, sold by Occidental Chemical Corporation; North Tonawanda, N.Y. This fiber reinforced phenolic material is specifically formulated to achieve wear resistance, dimensional stability, creep resistance, compression strength, impact strength, and weight required for a sheave operating in an automotive accessory drive system.

The sheave includes a first surface 64 the inside diameter, which is textured for optimizing adhesive bonding to the mounting surface of the pulley. The external surface of the sheave is molded with V-shaped grooves to facilitate driving engagement with the drivebelt. Several rails 66, distributed at approximately 120° intervals about the central axis of the shaft, extend from surface 64 radially inward a predetermined depth and extend circumferentially a short width. The depth of the rails is greatest at the free end 68 of sheave 62, the end distant from inclined surface 72, and decreases linearly in the direction of the inclined surface along slope B, about two degrees, as distance from the free end increases. Therefore, when the sheave is fitted over the mounting surface by moving the sheave leftward, when viewed as in FIG. 3, the rails and mounting surface 56 have ample clearance when the pulley first enters the sheave. However, as the sheave and pulley move further toward the position of FIG. 3, the rails gradually contact the mounting surface and become seated on the mounting surface in the vicinity of free end 68.

The sheave includes an inclined face 72 located after assembly adjacent the inclined face 58 of pulley flange 70. Stop beads 74, located on the inclined or second surface 72 of the sheave, extend a short distance axially toward the inclined surface 58 of the pulley, and angularly substantially the entire circumference of the sheave. FIG. 2 shows the stop beads are interrupted to define vent passages 76, the plane portion of surface 72 where the beads are absent. When the stop bead contacts the inclined surface of the pulley during the assembly process, the lateral center line of the sheave is correctly located on the pulley.

The sheave is bonded to the rail using an epoxy structural adhesive, such as Fusor 320 or 321 sold by Lord Corporation, Erie, Pa. The epoxy material includes rubber adhesives to provide flexibility needed to compensate for differences in thermal expansion and contraction between the low carbon steel pulley and the phenolic sheave assembly. Bonding the sheave to the pulley begins by applying at room temperature a bead of epoxy adhesive around the periphery of the mounting surface at the end of the pulley farthest from inclined flange 70 or by applying a bead of epoxy to the first surface of the sheave in the vicinity of the intersection of inclined surface 72 and first surface 56. The volume of the epoxy adhesive applied should be sufficient to adequately wet the surfaces of the sheave and pulley with adhesive and to fill the arcuate spaces between and below the rails and the space between the inclined surfaces of the pulley and sheave.

After the bead of adhesive is applied, the sheave is moved axially over the mounting surface until the stop beads contact the inclined surface 58. Before the epoxy adhesive begins to polymerize, the sheave may be rotated on the pulley a sufficient amount to assure that the adjacent surfaces of the sheave and pulley are contacted by the adhesive. Next, the relative positions of the sheave and pulley are maintained and the components in that position are heated in an oven for about ten minutes at 250° F. during which period the epoxy polymerizes. Then the parts are removed from the oven and allowed to cool to room temperature. Excess epoxy material in the precured condition extrudes between the stop beads through the vent ports to indicate an adequate volume of adhesive has been applied.

Having described a preferred embodiment of my invention, what I claim and desire to secure by U.S. Letters Patent is:

1. A belt-driven Pulley assembly for an clutch comprising:

a pulley having a central axis, a mounting surface coaxial with the central axis, a surface adjacent the mounting surface, inclined with respect to the mounting surface extending radially therefrom; and a sheave coaxial with the pulley surrounding the mounting surface, including an external surface suited for driveable engagement by a drive belt, a first surface facing and adjacent the mounting surface, a second surface facing and adjacent the inclined surface of the pulley, first means for establishing a radial spacing between the first surface and the mounting surface, stop means for establishing a spacing between the second surface and the inclined surface of the pulley, vent means for allowing air to pass the stop means; and means located between the mounting surface and the first surface for bonding the pulley and the sheave forming a connection therebetween.

2. The pulley assembly of claim 1 wherein the first means comprises rails located on the first surface, angularly spaced about the axis of the sheave, having axial length, circumferential width, and radial depth, the depth increasing along the rail length from a minimum depth adjacent the second surface to a predetermined maximum depth distant therefrom.

3. The pulley assembly of claim 1 wherein the stop means comprises a stop surface located on and extending outward a predetermined distance from the second surface toward the inclined surface of the pulley.

4. The pulley assembly of claim 1 wherein the first means comprises rails located on the first surface, angularly spaced about the axis of the sheave, having axial length, circumferential width, and radial depth, the depth increasing along the rail length to a predetermined maximum depth adjacent the second surface; and
   the stop means comprises a stop surface located on and extending outward a predetermined distance from the second surface toward the inclined surface of the pulley.

5. The pulley assembly of claim 4 wherein the stop means comprises a bead located on the second surface, having arcuate length extending around the second surface, depth directed outward a predetermined distance from the second surface, and radial width, and wherein the vent means comprises a passage directed across the width and depth of the bead.

6. The pulley assembly of claim 1 wherein the stop means comprises a bead located on the second surface, having arcuate length extending around the second surface, depth directed outward a predetermined distance from the second surface, and radial width, and wherein the vent means comprises a passage directed across the width and depth of the bead.

* * * * *